United States Patent
Himmelbauer

(10) Patent No.: US 12,039,466 B2
(45) Date of Patent: Jul. 16, 2024

(54) WORKSTATION WITH A REMOTE CONTROL DEVICE AND PICKING SYSTEM

(71) Applicant: TGW Logistics Group GmbH, Marchtrenk (AT)

(72) Inventor: Hannes Himmelbauer, Krenglbach (AT)

(73) Assignee: TGW Logistics Group GmbH, Marchtrenk (AT)

( * ) Notice: Subject to any disclaimer, the term of this patent is extended or adjusted under 35 U.S.C. 154(b) by 142 days.

(21) Appl. No.: 17/614,054

(22) PCT Filed: May 27, 2020

(86) PCT No.: PCT/AT2020/060212
§ 371 (c)(1),
(2) Date: Nov. 24, 2021

(87) PCT Pub. No.: WO2020/237272
PCT Pub. Date: Dec. 3, 2020

(65) Prior Publication Data
US 2022/0391824 A1 Dec. 8, 2022

(30) Foreign Application Priority Data
May 28, 2019 (AT) .............................. A 50484/2019

(51) Int. Cl.
*G06Q 20/20* (2012.01)
*G06Q 10/087* (2023.01)
*H04Q 9/00* (2006.01)

(52) U.S. Cl.
CPC .................. *G06Q 10/087* (2013.01)

(58) Field of Classification Search
CPC ............. G06Q 10/087; G08C 2201/12; G08C 2201/20; G08C 17/02; B65G 1/1378
(Continued)

(56) References Cited

U.S. PATENT DOCUMENTS 9,199,792 B2  12/2015 Schaefer
11,325,782 B2 * 5/2022 Avraham ................. B25J 13/02
(Continued)

FOREIGN PATENT DOCUMENTS

DE        20110457 U1   2/2002
DE  10 2006 057 266 A1  5/2008
(Continued)

OTHER PUBLICATIONS

International Search Report in PCT/AT2020/060212, mailed Nov. 4, 2020.
(Continued)

*Primary Examiner* — Garcia Ade
(74) *Attorney, Agent, or Firm* — Collard & Roe, P.C.

(57) ABSTRACT

At a workstation for an order-picking system, with a remote control device are a source load carrier, and a target loading aid of a picking order, wherein the operator reloads at least one article unit according to an order. By actuating a confirmation control element, the operator indicates the completed reloading to a process controller of the workstation, which is configured to trigger a step following the current order. The confirmation control element has a base station and a mobile unit, between which a coupled wireless data communication connection is established. The mobile unit has an actuating element with an electric contactor, an electric energy storage, and a micro controller with a communication interface. Moreover, the data communication connection is only established during an actuation of the actuating element and the transmission of the data telegram.

18 Claims, 3 Drawing Sheets

(58) Field of Classification Search
USPC .......................................................... 705/28
See application file for complete search history.

(56) References Cited

U.S. PATENT DOCUMENTS

| | | | |
|---|---|---|---|
| 2006/0287783 A1* | 12/2006 | Walker | H04Q 9/00 |
| | | | 701/31.4 |
| 2008/0071429 A1 | 3/2008 | Kraimer et al. | |
| 2011/0118903 A1* | 5/2011 | Kraimer | G05D 1/0016 |
| | | | 701/2 |
| 2018/0039245 A1 | 2/2018 | Hobbs | |
| 2018/0141751 A1 | 5/2018 | Muranaka | |
| 2022/0144545 A1* | 5/2022 | Harder | B65G 1/1375 |

FOREIGN PATENT DOCUMENTS

| | | |
|---|---|---|
| DE | 10 2015 211 761 A1 | 12/2016 |
| EP | 2 607 271 A1 | 6/2013 |
| JP | H02-74889 A | 3/1990 |
| JP | H04-251010 A | 9/1992 |
| JP | 2018/115055 A | 7/2018 |
| WO | 2012100150 A1 | 7/2012 |
| WO | 2018/146687 A1 | 8/2018 |

OTHER PUBLICATIONS

Khanchuea et al., A Multi-Protocol IoT Gateway and WiFi/BLE Sensor Nodes for Smart Home and Building Automation: Design and Implementation, 2019 10th International Conference of Information and Communication Technology for Embedded Systems (IC-ICTES), 6 pages.

* cited by examiner

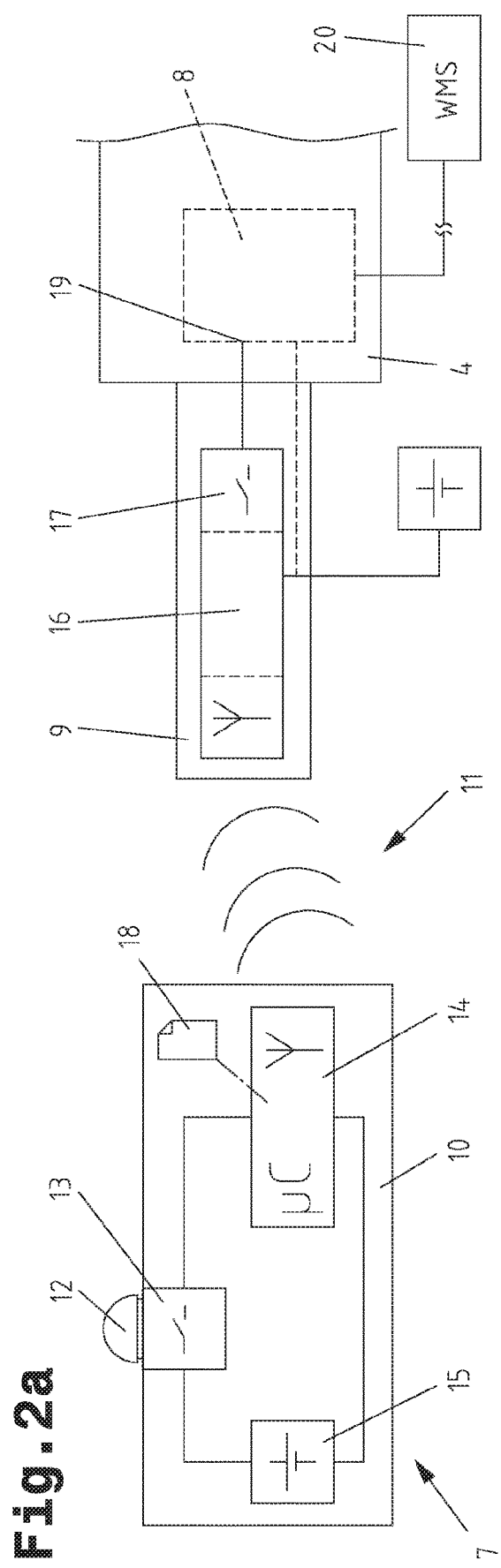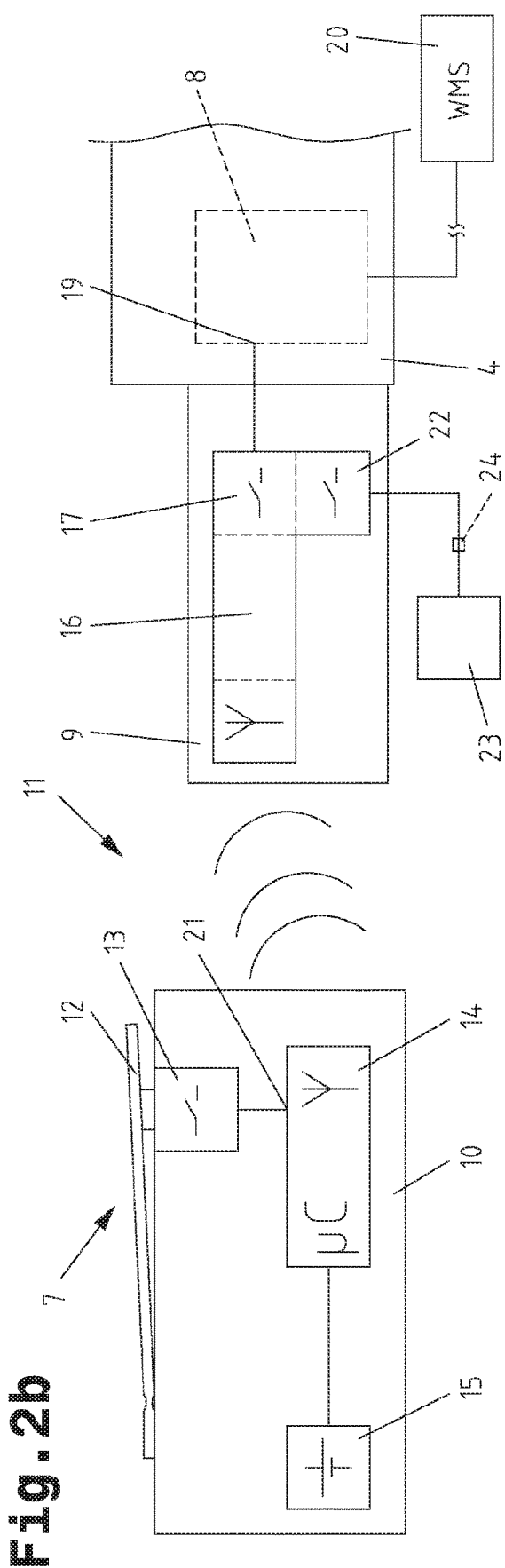

WORKSTATION WITH A REMOTE CONTROL DEVICE AND PICKING SYSTEM

CROSS REFERENCE TO RELATED APPLICATIONS

This application is the National Stage of PCT/AT2020/060212 filed on May 27, 2020, which claims priority under 35 U.S.C. § 119 of Austrian Application No. A 50484/2019 filed on May 28, 2019, the disclosure of which is incorporated by reference. The international application under PCT article 21(2) was not published in English.

BACKGROUND OF THE INVENTION

1. Field of the Invention

The invention relates to a workstation for an order-picking system, and an order-picking system.

2. Description of the Related Art

When picking orders, an operator transfers an article at a workstation from a source load carrier provided at the workstation into a target load carrier according to a picking order. When this process is completed, the operator has to announce the completion to the workstation and/or the superordinate warehouse management system (WMS) in order to trigger the next working step.

To this end, it is known to arrange a confirmation control element, which has to be actuated by the operator after completion of a working step, at the workstation. Subsequently, for example both load carriers are transported away from the workstation, and new load carriers for the next picking order are provided at the workstation. Or, only one of the two load carriers is exchanged, as the other load carrier is still needed for the following picking order.

In any case, this exchange/replacement must be triggered by a manual confirmation action by the operator. The load carriers are often arranged around the operator such that as ergonomic a workflow as possible is achieved, meaning the movements required by the operator are as short as possible for performing the picking operation. Hence, the confirmation control element is also arranged at a handily placed position, most times centered between the load carriers.

But even with the best possibly handily placed arrangement, the problem remains that the motion sequence of the operator is disturbed by the actuating action. Put simply, the reloading of the article takes place approximately along a circular path from the source container to the target container. The confirmation control element can therefore not be situated on this path as, otherwise, it would be in the way of the motion sequence—hence, it is oftentimes arranged so as to be set back on a housing part of the workstation. The operator must thus oftentimes move their torso forwards in order to be able to reach the control element. From a perspective of labor physiology, this is a disadvantage—furthermore, each of these actions requires additional time.

For improving the ergonomic situation, for example a wirelessly connected hand-held transmitter is known from US 2018/141751 A1, which can be used to trigger an emergency stop of a storage and retrieval device.

A similar hand-held transmitter for being able to stop a conveyor belt in case of emergency is known from US 2018/039245 A1.

The disadvantage of these systems is that the suggested transmission units are designed for an emergency, which will only occur very rarely—ideally never—during regular cases of operation. In contrast, the confirmation control element is actuated very frequently, so that an entirely different, in particular challenging, situation arises with respect to the electric energy supply.

As a further prior art, for example a robot controller is known from WO 2018/146687 A1, in which, according to one embodiment, the input and/or control element is designed as a glove.

A further disadvantage of known systems is that the mobile transmission unit and the device to be controlled are not fixedly assigned to one another. As most of the time, multiple workstations in an order-picking system are arranged closely together, it is significant that a mobile transmission unit can only operate one specific—the assigned—workstation. It must reliably be made impossible that an operator triggers the confirmation of an executed picking operation at a different workstation than their own.

JP 2018-115055 A discloses a (mobile) picking station for performing picking orders by means of a picker in an article storage. A confirmation device is provided, which consists of a mobile unit and at least two assigned "access points", which communicate wirelessly with one another via a WLAN network. The access points moreover are connected with a superordinate article management computer. The mobile unit may be fixedly mounted on the picking station or be flexibly carried by the picker. Once the processing of the picking order is complete, it is confirmed on the mobile unit and a confirmation signal is transmitted to the access points. Furthermore, messages may be transmitted from a server to the mobile unit, which messages comprise picking information, so that a permanent communication connection must be established for the mobile unit to be able to receive incoming messages at any time.

JP 4-251010 A discloses a remote control device, which can send a confirmation signal to a superordinate article storage control computer upon completion of a picking operation.

DE 10 2015 211 761 A1 discloses a monitoring system for a picking station, which monitoring system comprises a camera system. The camera system is configured to capture activities of a picker, evaluate them, and derive control information therefrom.

EP 2 607 271 A1 discloses a method for picking, wherein the confirmation of the execution of the picking order takes place by means of an electromechanical or software-operated input means.

DE 201 10 457 U1 discloses a picking display device for displaying a picking operation to be processed, which comprises a microphone for being able to confirm the completion of a picking operation acoustically. Furthermore, a key panel is provided, wherein the completion of the picking operation can be confirmed by touch. For transmitting and subsequently evaluating the speech commands, the picking display device and a picking control computer can be connected to one another by means of a radio link.

DE 10 2006 057 266 A1 discloses a light grid or a confirmation unit, the latter allowing a completed picking operation to be detected and indicated.

JP 2-74889 A discloses a picking operation, in which input commands can be given by a picker by means of input keys arranged on a glove and be transmitted to a superordinate control system.

SUMMARY OF THE INVENTION

The object of the invention is to equip a workstation of an order-picking system with a remote control element, which remote control element can send messages to the fixedly-assigned working location by means of a communication connection, and which has an energy usage allowing long-term operation over multiple days. In particular, an order-picking system is to comprise such a workstation.

The object of the invention is achieved by a workstation for an order-picking system, the workstation being connected to a storage system by means of a conveying system. At the workstation, article units are transferred from a source load carrier to a target load carrier according to an order. In this regard, the order is a picking order, a reloading order (decanting order) and the like. The source load carrier and/or the target load carrier are, for example, containers, cardboard boxes, pallets, hanging bags, and the like. At the workstation, a source load carrier and a target load carrier for processing an order are provided, wherein the operator transfers at least one article unit from the source load carrier into the target load carrier according to an order. The workstation comprises a process controller and a confirmation control element connected to the process controller, wherein the process controller is configured to trigger a step following a current picking order after actuation of the confirmation control element by the operator. The confirmation control element has a base station and a mobile unit, between which a coupled wireless data communication connection is established. The base station has a receiving and evaluation unit, which is configured to always receive data telegrams of the mobile unit, and which further has a switching output that is connected to a control input of the process controller. Furthermore, the mobile unit has an actuating element with an electric contactor, an electric energy storage, and a micro controller with a communication interface. The micro controller is configured to send a data telegram via the communication interface upon actuation of the actuating element and thus actuation of the contactor. Moreover, the data communication connection is only established during an actuation of the actuating element and the transmission of the data telegram.

Using a mobile unit with the present features, the operator is given the opportunity to position it wherever the operator can best reach them, thus requiring the shortest possible additional distance. The coupled data communication connection further ensures that an operator can trigger confirmation actions only at their own, assigned workstation. As, on the one hand, the connection is coupled, and as moreover, a data connection is established, it is clearly specified that only the components assigned to one another can exchange commands, in particular can receive and accept commands. An erroneous false triggering at a neighboring workstation is thus es-sentially impossible.

As there are no limitations with respect to energy availability at the workstation, it is provided that the base station is constantly ready-to-receive, so that an incoming data telegram can be evaluated immediately, and a switching output can be activated. For achieving a long-term operation, the data communication connection is only established during the actuation of the actuating element and transmission of the data telegram.

However, this particularly also means that the data communication connection is already inactive after the transmission of the data telegram has been completed, even if the actuating element is still actuated. However, this also means that the data communication connection remains established until the transmission of the data telegram is completed, even if the actuating element is no longer actuated. Due to the processing speed of the micro controller and the transmission speed of the communication connection, however, this case is rather unlikely.

In the prior art, data communication connections are mostly active and regularly exchange at least status information, which leads to high energy usage and contradicts a long-term operation. It would generally be conceivable to also increase the energy storage.

According to an advancement, it is provided that the data communication connection is formed by a packet-based radio data connection, in particular by means of WLAN, and preferably by means of a paired radio data connection. This advancement has the advantage that existing standardized communication means can be used. In particular, a packet-based data connection has an implemented addressing, so that a check and/or securing of a coupling can be simplified. According to a preferred embodiment, ESP-NOW by Espress if is used as the paired radio data connection, which, after an initial pairing of the communication partners, enables a communication without requiring a handshake. Thereby, a very swift connection establishment is achieved, and the active transmission duration is reduced, which is advantageous for a long-term operation.

An advancement also consists in that access data of the base station, in particular a network identifier, is stored in a storage means of the micro controller. The particular advantage of this advancement consists in that thereby, an establishment of the communication connection, from a non-operating state of the communication interface, is possible particularly swiftly, as no communication and/or signaling data has to be exchanged.

According to a further advancement, it is also provided that the energy storage, the electric contactor, and the micro controller form an electric circuit, in particular that a closed circuit is formed by an actuated contactor. This embodiment has the particular advantage that the micro controller is only actually supplied with electric energy when the contactor is pressed and can only consume energy in this time period, which increases the achievable operating time significantly. The micro controller can comprise a switching unit, which is configured to recognize a drop in supply voltage after the end of actuation and to transfer the micro controller into an orderly state. For this purpose, this switching unit will have a small energy storage, which contains sufficient energy for carrying out this process in a controlled manner.

As micro controllers potentially require some time to start, it is alternatively also provided, according to an advancement, that the electric contactor is connected to a detection input of the micro controller. The micro controller monitors the switching state of this detection input and, upon contact connection by means of the electric contactor, sends a data telegram to the base station via the communication interface.

It is also particularly advantageous for achieving a long operating time, if the micro controller has a non-operating state operating mode, in particular a deep non-operating state. A non-operating state of a micro controller has the advantage that all operationally relevant parameters are stored in the micro controller and are thus instantly available upon return from the non-operating state, in particular without having to undergo a time-consuming initialization. A deep non-operating state is particularly characterized in that the micro controller substantially does not consume any energy. In this operating mode, only those modules are active in the micro controller which are required to wake the micro controller up from the deep non-operating state.

According to an advancement, it is provided that the base station has a further switching output, which is possibly connected to a data processing system via an interface. Apart from triggering the confirmation of the performed picking, it may be required to, for example, be able to trigger an additional function. It may be impossible to tap the switching output connected to the control input of the process controller, in order to derive a further control signal therefrom. Thus, a further, independent switching output is present according to this advancement. The two switching outputs are preferably activated simultaneously. According to a further advancement, however, it may also be provided that the further switching output is activated with a time delay, or that a particular switching pattern is created, for example similar to a double click known from computer technology.

It may, for example, be provided that, along with the confirmation of the picking operation, an action is to be triggered on an external data processing system, as well. For example, the workstation may be part of a training system, in which prospective pickers can train their future tasks. In such a training system, a presentation is very likely to run simultaneously, wherein the transition of images is usefully to take place synchronously with the picking operation. It is therefore provided that the interface is formed by a controller of a human-machine interface, for example by a controller of a (computer) keyboard. Such a controller is connected to a data processing system via an interface, for example USB, and can send those control commands which are required for controlling the presentation.

An advancement also consists in that the receiving unit is configured to transmit a confirmation message to the mobile unit, in particular via the communication interface to the micro controller. Due to mechanical processes and communication processes at the workstation and/or in the warehouse management system, it may occur that, after actuating the actuating element, some time passes until the workstation triggers the following action. Even if this time delay is very minor, it can cause irritation in the very tight work cycle of a picker. According to this advancement, a feedback can now be issued to the picker that the confirmation has been received by the base station, evaluated, and forwarded to the process controller of the workstation or to a superordinate warehouse management system. The picker can thus already prepare for the next operation, even if it is not yet perceivable at the workstation that this action is already in progress, for example due to environmental noise and/or due to housing parts blocking the view.

To that effect, the advancement also consists in that the mobile unit has a signal generator connected to the micro controller. This signal generator may be designed, for example, to be optically and/or acoustically effective. According to a further embodiment, the signal generator may also be designed to be mechanically effective, for example a vibration element. Hence, one or also multiple of the possible embodiments may be realized.

An advancement also consists in that the mobile unit has a housing, which is formed by a base body and the actuating element, wherein the energy storage, the contactor and the micro controller are accommodated in the housing. Thus, a compact, integrated unit is created, which has a robust design for the daily picking routine which is quite rough at times, and which gives reason to expect high acceptance due to the compact structure.

An advantageous advancement also consists in that the base body has an adhesive element for releasably arranging the mobile unit on a component of the workstation. The adhesive element may be designed, for example, as a magnet and/or as an adhesive base. As, in a workstation, many components, preferably metallic components, with differently oriented surfaces will be present in the working area of the operator, the design with magnets is preferred. The operator can thus mount the mobile unit directly in their vicinity on a front face of the workstation and adapt it exactly to their own labor-physiological needs.

A further advantageous advancement consists in that the base body has an elastic clip element, which is designed to attach the base body to a piece of clothing, which piece of clothing is worn by the operator. Thus, it can be realized that the mobile unit is always at the same location on the body, independently of the respective position of the operator with respect to the workstation. According to a possible embodiment, the clip element may be designed as a clamp, whereby the mobile unit may be arranged, for example, on a belt or on an outer pocket of a piece of clothing.

It also proves advantageous if the actuating element can be actuated with one hand. The single-handed operation not only allows easy operation, but a processing order can be performed particularly swiftly, as the end of the processing order can be confirmed already during the working movement. If it is a picking order, for example, in which an article is removed from a source load carrier and placed into a target load carrier by a picker using one hand, the end of the picking order can be confirmed using the other hand immediately after the article has been placed down.

With respect to the most physiological workflow possible, it is provided according to an advancement, that the mobile unit is arranged in a glove, which glove is worn by the operator. According to this embodiment, the workstation for the order-picking system comprises at least one glove.

According to a possible embodiment, it may be provided that the glove has a back-of-the-hand section, a palm section, and finger sections, and that either the actuation element is arranged on the palm section such that the actuation element can be reached and actuated using one of the finger sections, or the actuation element is arranged on a first finger section of the finger sections such that the actuation element can be reached and actuated using a second finger section of the finger sections.

The glove is a full-fingered glove or a mitten. Both types of glove have a back-of-the-hand section, a palm section and finger sections. The full-fingered glove comprises five finger sections. Each finger section surrounds one finger, wherein a first finger section is assigned to the index finger, middle finger, ring finger, and little finger, respectively, and a second finger section is assigned to the thumb. The mitten has a first finger section in the area of the four fingers, surrounding all fingers together, such that the four fingers are situated in a joint shell, and a second finger section surrounding the thumb.

With such an embodiment, an increased ease of use for the operator is achieved.

During the picking activity, most times, the operator wears gloves and this advancement has the advantage that an additional movement for triggering the confirmation of the completed picking operation is minimized. In order to not compromise the gripping action, the energy storage and the micro controller are preferably arranged on a glove outside, in particular on a back-of-the-hand section. The actuating element will also preferably be arranged such that an erroneous actuation during the picking operation is impossible. In this respect, it may be provided, according to a further embodiment, that the actuation element is also preferably arranged on the glove outside, in particular on a back-ofthe-hand section such that the actuation element can be reached only by a conscious gripping action using the second hand. The actuation element may be arranged, for example, in the area of the first finger phalanx from the index finger (first finger section) so that the actuation element can be actuated using the thumb (second finger section). In order to prevent an erroneous triggering caused by contact with an article, an advancement may provide that the actuating element has to be pressed for a (short) period of time before the conformation action is triggered.

As a redundancy, for example to prevent any substantial disturbances of the picking process in case of a disturbance of the remote control device, an advancement provides that the base station has a further actuation element with an electric contactor, which is connected to the control input of the process controller, in particular in parallel to the connected switching output of the mobile unit, and/or that a further actuation element is arranged at the workstation, wherein the contactor of the further actuation element is connected to the receiving and evaluation unit. Hence, for example, an existing actuating element can be used together with the remote control device.

Using the remote control device is advantageous due to the fact that the remote control device can be used at any time on an existing workstation, in particular by the switching output of the mobile unit being connected to the control input of the process controller, to which the existing actuation element is already connected.

The terms used here are defined below.

An order is electronically acquired as a data set and is processed by a data processing unit. The order is not necessarily to be equated with a picking order but rather, it may also be a repacking order, a replenishment order, and the like. A picking order and/or an order in general is to be understood as the assembling of requested articles of a customer order. A sales order comprises at least one order. Each order comprises one or multiple order lines. If the order specifies multiple order lines, different goods are needed. In e-commerce, the lot sizes are small, so that there is a relatively high number of different orders, each having few order lines. Reference is made to a repacking order when, for example, articles in the goods-in area are to be transferred from a delivery unit (first load carrier) onto or into a second load carrier. Reference is made to a replenishment order when articles are filled onto or into a load carrier and/or a replenishment of the warehouse as part of stocking up a warehouse.

An article or SKU (stock keeping unit) is the smallest article packaging that can be picked. This unit may consist of a single item although it is also possible that one article comprises multiple items which, however, are assembled such that they cannot be separated by picking.

Depending on the embodiment of the load carrier, the article may be arranged in the load carrier if it is configured, for example, as a container. In case it is configured as a tray, the article may be arranged on the load carrier. It should expressly be noted that both terms are used here synonymously and using in or on the load carrier does not imply a specific configuration of the load carrier.

The object of the invention is also achieved by an order-picking system being equipped with at least one workstation as described above.

BRIEF DESCRIPTION OF THE DRAWINGS

For the purpose of better understanding of the invention, it will be elucidated in more detail by means of the figures below.

FIG. 2a) and b) show possible embodiments of the remote control device;

DETAILED DESCRIPTION OF THE PREFERRED EMBODIMENTS

It is noted that the representation shows only a very small cutout of an actual realization of an order-picking system. In particular, most times, only a minimal configuration is shown in order to be able to describe the individual elements of the order-picking system. A realized system is significantly larger, and above all, the individual components will be larger and/or present in greater numbers.

As the individual components of the order-picking system, in particular the warehouse system and the conveying system, are not the subject matter of this invention, they are not elucidated further here. As an example not to be understood as exhaustive, the storage system may be a shuttle warehouse, and the conveying system may be a roller conveying system. Instead of a stationary conveying system, autonomous transport vehicles ("automated guided vehicle" AGV, or "autonomous mobile robots" AMR) may be used.

Figure 1:
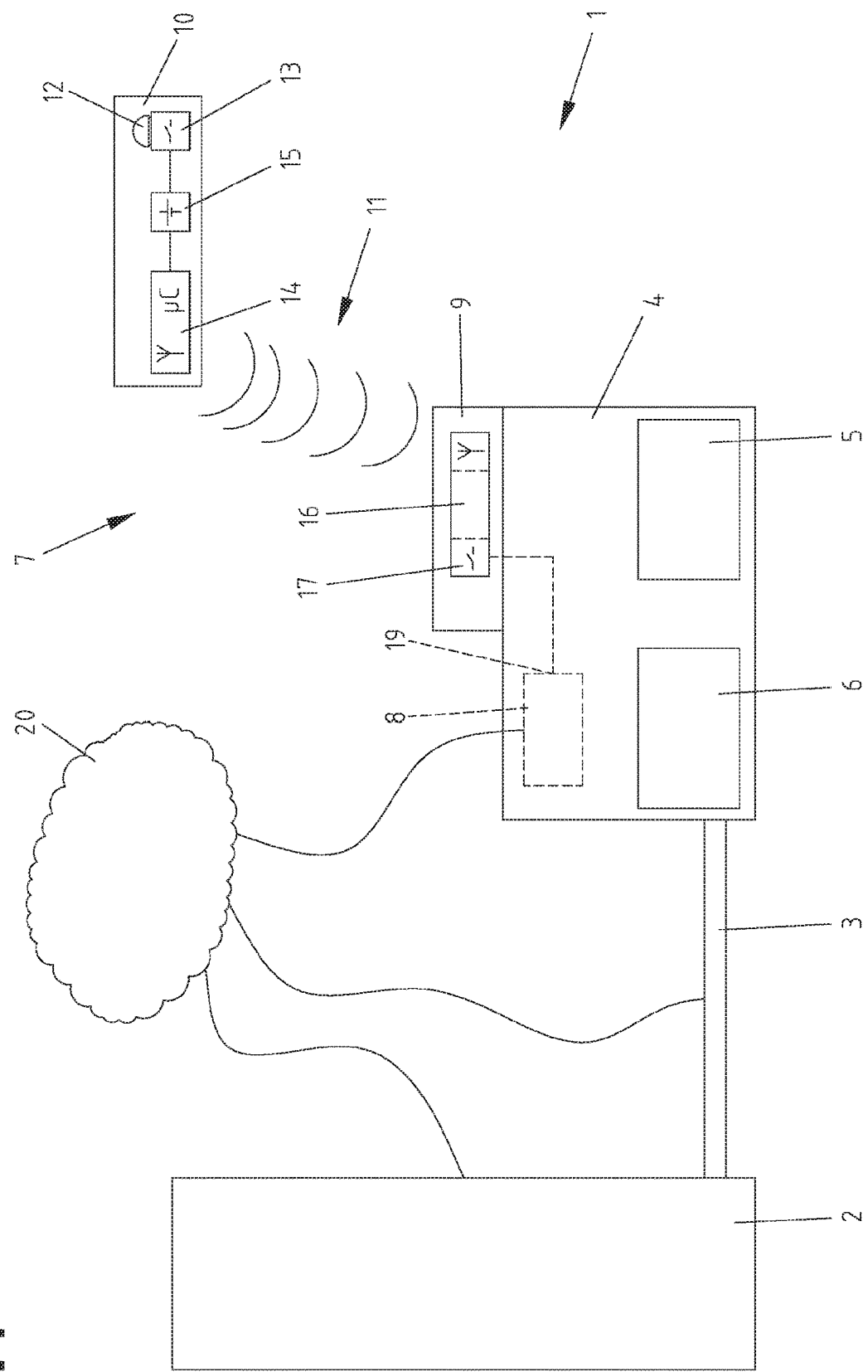
FIG. 1 shows a remote control device in an order-picking system in an overview.

FIG. 1 shows an order-picking system 1 comprising a storage system 2 and a workstation 4 connected, in respect of an article flow, to the storage system 2 by means of a conveying system 3. The workstation 4 comprises a remote control device. When processing picking orders at a workstation 4, an article is reloaded from a source load carrier 5 into a target load carrier 6 by an operator. The reloading, and thus the completion of the picking order, is confirmed by actuating an actuating element of a confirmation control element 7. A process controller 8 of the workstation evaluates this confirmation signal and carries out a picking step following the current picking order. This may, for example, be an exchange of both load carriers 5, 6 if the following picking step requires a new source load carrier 5 and a new target load carrier 6. The following picking step may also consist in that only one of the two load carriers 5, 6 is exchanged. Here, an exchange of a load carrier 5, 6 is understood to mean that the load carrier 5, 6 is automatically transported away from the provisioning position at the workstation 4, and a new load carrier 5, 6—in most cases, the next one—is transported to the provisioning position, which is now free, so that the operator can carry out the following picking step. In order to be able to perform this provisioning change swiftly, the workstation 4 will also have conveying system components, which can supply and transport away load carriers 5, 6 in a non-blocking manner. The conveying system 3 between the workstation 4 and the storage system 2 will also be designed to have multiple tracks at least in some regions, in order to be able to provide the transport capacity between the workstation 4 and the storage system 2.

However, the workstation 4 may also be designed to forward the detected confirmation signal to a superordinate warehouse management system 20, which carries out the coordination of the further steps in the picking process, in particular the coordination of the processes in the storage system 2, on the conveying system 3 and the workstation 4, and therefore, the command for performing a load carrier change is transmitted to the workstation 4.

It is provided that the confirmation control element 7 has a base station 9 and a mobile unit 10, between which a coupled, wireless data communication connection 11 is established. The coupling ensures a clear assignment between the mobile unit 10 and the base station 9—and thus the workstation 4—and thus, makes an erroneous operation of a different workstation impossible. As the communication connection is established only during the actuation of the actuating element, without the suggested coupling, the communication connection would have to be re-established for each transmission process, which costs time and, above all, energy.

The mobile unit 10 comprises an actuating element 12 with an electric contactor 13. The actuating element 12 may be formed by a button, a rocker, a flap, or the like. The electric contactor 13 is preferably formed by a switching contact. The mobile unit further has a micro controller (μC) 14 and an electric energy storage 15 for supplying the micro controller 14. The micro controller 14 is designed for evaluating the switching state of the contactor 13 and sends a data packet to the base station 9 by means of the communication connection 11 upon contact connection. In order to receive data packets via the established communication connection 11, the base station 9 has a receiving and evaluation unit 16 with a receiving device. The receiving and evaluation unit 16 further has a switching output 17, which is connected to a control input 19 of the process controller 8. If a data packet is received by the receiving and evaluation unit 16, it is evaluated and checked whether the sending mobile unit 10 is authorized or if an erroneous communication has occurred. After a successful check, the switching output 17 is activated, whereupon the process controller 8 of the workstation 4 triggers the next step.

According to a further possible embodiment, it may be provided that, due to the electric design and/or the electric wiring of the micro controller 14, it is possible for example by providing small capacities storing energy for a short time, that the communication connection may remain in place even for a short time after releasing the actuation of the actuating element, for example, in order to explicitly also transmit the status of the released actuation to the process controller 8 of the workstation 4, and/or in order to transfer the micro controller 14 into an orderly shut-off or non-operating state. The capacities are particularly not intended to maintain a (full) operation, as the additional loading processes would significantly increase the total energy consumption. Only as much energy as needed to prevent a disorderly end of operation of the micro controller is supposed to be present.

FIGS. 2a) and b) show two possible embodiments of the electric wiring of the confirmation control element 7. Both embodiments shown have in common that the communication connection 11 is only active during the time, in which the actuating element 12 on the mobile unit 10 is actuated, and thereby the electric contactor 13 is activated.

In the preferred embodiment according to FIG. 2a), the contactor 13 is designed as a make contact and forms, together with the electric energy storage 15 and the micro controller 14, an electric circuit. According to this embodiment, the circuit is only closed when the actuating element 12, and thus also the contactor 13, is actuated.

The counterpart of the communication connection 11 is the base station 9 at the workstation 4, in particular the receiving and evaluation unit 16, which has an independent energy supply, or supplied with electric energy by the workstation 4 and is thus permanently designed for receiving data telegrams of the mobile unit 10. The data telegrams coming in via the communication connection 11 are received by the receiving and evaluation unit 16 and it is checked, in the course of the evaluation, whether the data telegram was sent from an authorized mobile unit 10.

The receiving and evaluation unit 16 further has a switching output 17, which is activated after evaluation and positive checking of the received data telegram. This switching output 17 is connected to a control input 19 of the process controller 8 of the base station 9. Using a signal at this control input 19, the process controller 8 triggers the steps of the next pending picking operation. However, the signal may possibly also only be forwarded to the superordinate warehouse management system (WMS) 20, which subsequently carries out the coordination of the next steps. Details of the individual processes in an order-picking system, in particular at or in the periphery of the workstation 4, are not the subject matter of this invention. Hence, they are not explained in further detail here.

According to an advancement, it is provided that in a memory means of the micro controller 14, access data 18 of the base station 9 is stored, in particular access data 18 of the receiving and evaluation unit 16. Hence, a time- and energy-intensive re-establishment of the communication connection 11 is not necessary when the micro controller 14 is activated.

FIG. 2b) shows a further possible embodiment of the confirmation control element 7. Here, the electric wiring of the components of the mobile unit 10 is designed differently. The energy storage 15 supplies the micro controller 14 with electric energy, the electric contactor 13 is connected to a detection input 21 of the micro controller 14 which evaluates the status of the contactor 13 and subsequently generates a data telegram. The further features are to be gathered from the description above.

The receiving and evaluation unit 16 on the base station 9 has a further switching output 22, which is preferably activated at the same time as the first switching output 17. According to a possible further embodiment, this further switching output 22 may also realize a time delay or a defined switching pattern. Preferably, this further switching output 22 is connected to a presentation system 23 for controlling a presentation running simultaneously with the picking operation on the workstation 4, possibly with an interposition of an interface 24.

In FIGS. 2a) and b), a further advantage of the remote control device is shown, if, according to a possible embodiment, the base station 9 is arranged at a workstation 4 later. Part of the basic configuration of a workstation 4 is often a confirmation control element 7, in particular also in order to be able to carry out picking actions in case of a failure of the remote control device. The base station 9 is preferably designed as an independent unit, so that only the switching output 17 of the receiving and evaluation unit 16 has to be connected to the switching output 19 of the process controller 8. This often means, in particular, that only the switching output 17 of the receiving and evaluation unit 16 must be switched in parallel to an actuating element and/or electric contactor fixedly installed at the workstation 4.

Figure 3C:
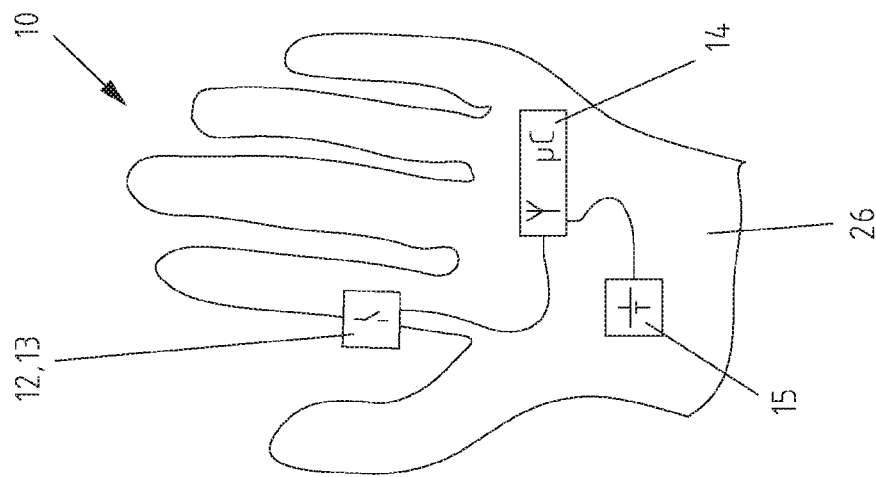
FIG. 3a) to c) show possible embodiments of the mobile unit.
Figure 3B:
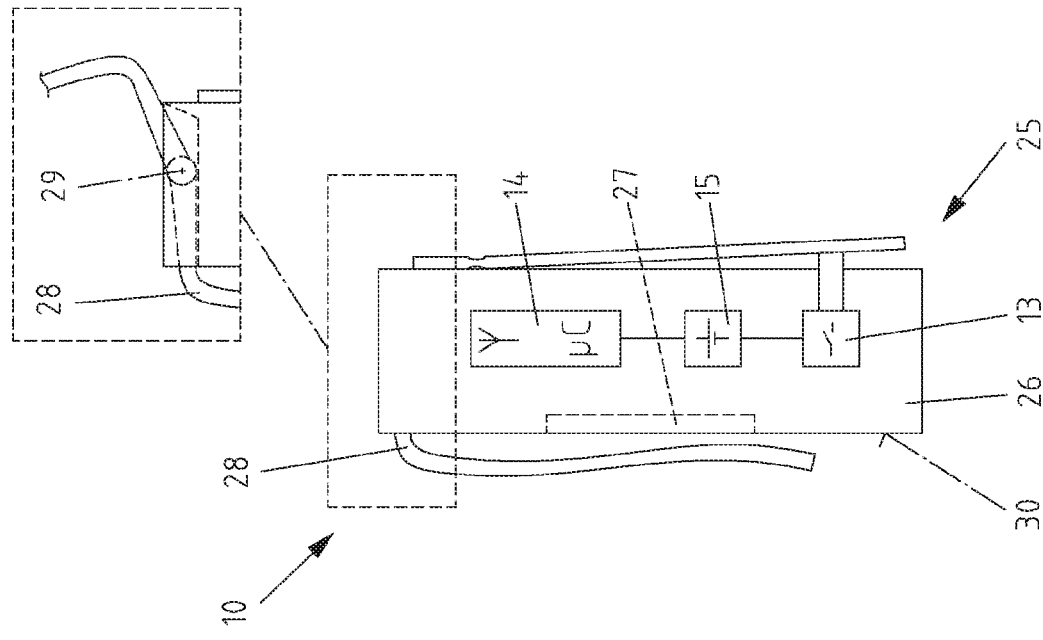
Figure 3A:
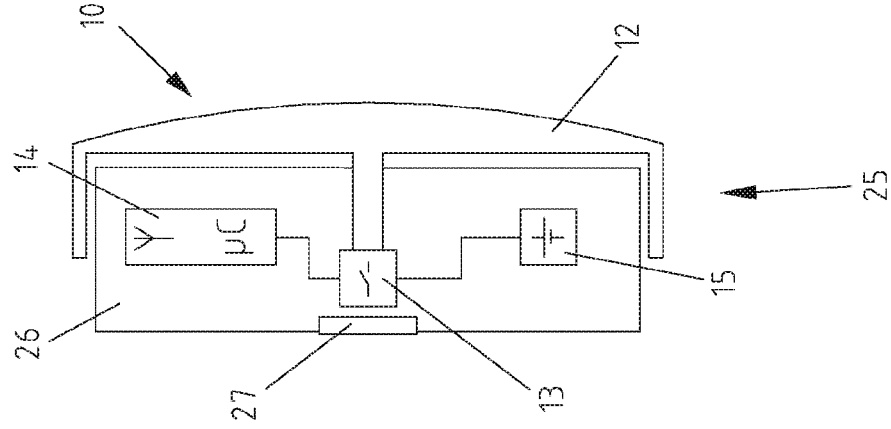

FIGS. 3a) to c) show possible housing embodiments of the mobile unit 10. It is explicitly pointed out that the figures are highly simplified and, in particular, only show the basic design. Mechanical/constructional details, such as guides and resetting elements for retaining the elements in their position, for example, are not shown in the figures for illustrative reasons, as they are not relevant for the invention.

FIG. 3a) shows a first embodiment of a housing 25, which has a base body 26 and an actuating element 12. In the base body 26, the energy storage 15, the contactor 13, and the micro controller 14 are accommodated. According to a possible embodiment, the actuating element 12 is designed as a lid covering the entire base body 26. This has the advantage that the operator does not have to aim precisely in order to actuate the actuating element 12, and to thereby trigger the sending of a data telegram, as the entire lid serves as a triggering element. In contrast, it is also possible, for ensuring a conscious triggering, that the actuating element 12 is designed as a push button, which, in addition, is possibly also protected against an accidental actuation by means of a constructional embodiment—for example by means of a re-cessed arrangement and/or a surrounding border.

Not shown are mechanical components for retaining the actuating element 12, in particular elastic elements for holding the actuating element 12 in its non-actuated position as standard, in particular so stably that an accidental actuation is prevented.

According to this embodiment, it is provided that at least one adhesive element 27 is arranged in the base body 26, which adhesive element 27 may be designed, for example, as a suction knob or preferably as a magnet. Using this adhesive element, the mobile unit 10 can be arranged on any flat and/or metallic surface. Such surfaces are present in at a workstation 4 in the area of the operator, so that they can arrange the mobile unit 10 as best-suited to their requirements as possible.

FIG. 3b) shows a further possible embodiment of the mobile unit 10, in particular of the base body 26, which embodiment is designed for being arranged on a piece of clothing. For this purpose, the base body 26 has an elastic clip element 28, which may be designed, for example, as a clasp. This clip element 28 makes it possible for an operator to arrange the mobile unit 10 for example on a belt, on a pocket or the like, and to also remove it. In this regard, the clip element 28 is constructionally designed such that it can be arranged on a plurality of pieces of clothing with different thicknesses. The piece of clothing, on which the mobile unit 10 is arranged, is clamped between the clip element 28 and the rear side 30 of the base body 26.

FIG. 3b) shows, in a detail view, a further possible embodiment, according to which it is provided that the clip element 28 is designed so as to be pivotable. For this purpose, the clip element 28 is arranged so as to be pivotable about an axis 29 in the base body 26. When arranged on a piece of clothing, the clip element 28 is pivoted inward, as shown in the overall view in FIG. 3b), so that the mobile unit 10 can be clamped on to a piece of clothing. However, the clip element 28 can also be pivoted outward about the axis 29—after a release of the clip element 28 out of its inward-pivoted position—so that the rear side 30 of the base body 26 is freely accessible again. In particular, the adhesive element 27 is exposed again to allow arranging the mobile unit 10 at the workstation 4, as described in FIG. 3a).

A further possible embodiment is shown in FIG. 3c). According to this embodiment, the mobile unit 10 is arranged on a glove. The glove is shown in a view onto the back-of-the-hand section. The glove comprises a back-of-the-hand section, a palm section, and finger sections, which are preferably sewn together. The glove forms the base body 26. Thereby, the mobile unit 10 is always directly on the operator, resulting in the shortest distances for them. A compact remote control element is achieved when the remote control element is arranged on the glove such that the actuating element 12 and/or the electric contactor 13 is handily placed on the index finger, or is arranged on the glove such that the actuation must be performed using one finger of the other hand, in order to prevent an erroneous triggering. In order to prevent the arranged components from compromising the picking action, the micro controller 14 and the energy storage 15 are preferably arranged in the area of the back of the hand. The demands of working safety also require a compact structure, as the arranged components must not be so voluminous that they interfere with the work of the operator.

Ultimately, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, are to be analogously transferred to the new position.

The exemplary embodiments show possible embodiment variants of the, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field. Thus, any and all conceivable embodiment variants, which are possible by combining individual details of the embodiment variant shown and described, are also covered by the scope of protection.

Finally, as a matter of form, it should be noted that for ease of understanding of the method steps, drawing elements are partially not depicted to scale and/or are enlarged and/or are reduced in size.

LIST OF REFERENCE NUMBERS

1 Order-picking system
2 Storage system
3 Conveying system
4 Workstation
5 Source load carrier
6 Target load carrier
7 Confirmation control element
8 Process controller
9 Base station
10 Mobile unit
11 Communication connection
12 Actuating element
13 Electric contactor
14 Micro controller
15 Electric energy storage
16 Receiving and evaluation unit
17 Switching output
18 Access data
19 Control input
20 Warehouse management system
21 Detection input
22 Switching output
23 Presentation system
24 Interface
25 Housing
26 Base body
27 Adhesive element
28 Clip element
29 Pivot axis
30 Rear side

The invention claimed is:

1. A workstation for an order-picking system, the workstation being connected to a storage system by means of a conveying system and comprising:
   a remote control device,
   a first provisioning position configured to provide a source load carrier,
   a second provisioning position configured to provide a target load carrier,
   wherein the source load carrier and the target load carrier are provided at the first provisioning position and the second provisioning position to process an order, when processing an order, an operator transferring at least one article unit from the source load carrier into the target load carrier according to the order,
   a process controller that comprises a control input, and
   a confirmation control element connected to the process controller,
   wherein the confirmation control element comprises a base station and a mobile unit,
   wherein the base station and the mobile unit are configured to allow a selectively active and inactive wireless data communication connection is established between the base station and the mobile unit,
   wherein the base station comprises a receiving and evaluation unit, and the receiving and evaluation unit is electronically configured to always receive electronic data telegrams of the mobile unit using the wireless data communication connection and comprises a switching output connected to the control input of the process controller, and
   wherein the mobile unit comprises an actuating element with an electric contactor, an electric energy storage, and a micro controller with a communication interface, and the micro controller is electronically configured to send an electronic data telegram of the electronic data telegrams by means of the communication interface upon actuation of the actuating element by the operator,
   wherein the data communication connection is only active during an actuation of the actuating element and the transmission of the electronic data telegram of the electronic data telegrams,
   wherein the receiving and evaluation unit receives the electronic data telegram of the electronic data telegrams in order to send a signal from the switching output to the control input, and
   wherein the process controller receives the signal at the control input and the signal is used to trigger a step carried out by the process controller following the current order, or a warehouse management system receives a signal after an actuation of the actuating element by the operator, and the signal is used to trigger a step carried out by the warehouse management system following the current order.

2. The workstation according to claim 1, wherein the data communication connection is formed by a packet-based radio data connection.

3. The workstation according to claim 2, wherein access data of the base station is stored in a memory of the micro controller.

4. The workstation according to claim 1, wherein the energy storage, the electric contactor, and the micro controller form an electric circuit.

5. The workstation according to claim 1, wherein the electric contactor is connected to a detection input of the micro controller.

6. The workstation according to claim 1, wherein the micro controller comprises a non-operating state operating mode.

7. The workstation according to claim 1, wherein the base station comprises a further switching output connected to a data processing system via an interface.

8. The workstation according to claim 7, wherein the interface is formed by a controller of a human-machine interface.

9. The workstation according to claim 1, wherein the receiving and evaluation unit is electronically configured to transmit a confirmation message to the mobile unit.

10. The workstation according to claim 9, wherein the mobile unit comprises a signal generator connected to the micro controller.

11. The workstation according to claim 1, wherein the mobile unit comprises a housing formed by a base body and the actuating element, wherein the energy storage, the contactor, and the micro controller are accommodated in the housing.

12. The workstation according to claim 11, wherein the base body has an adhesive element for a releasable arrangement of the mobile unit on a component of the workstation.

13. The workstation according to claim 11, wherein the base body comprises an elastic clip element designed to attach the base body to a piece of clothing, wherein the piece of clothing is worn by the operator.

14. The workstation according to claim 1, wherein the mobile unit is arranged on a glove, wherein the glove is worn by the operator.

15. The workstation according to claim 14, wherein the glove has a back-of-the-hand section, a palm section, and finger sections, and wherein either the actuation element is arranged on the palm section such that it the actuation element can be reached and actuated by one of the finger sections, or the actuation element is arranged on a first finger section of the finger sections such that it the actuation element can be reached and actuated by a second finger section of the finger sections.

16. The workstation according to claim 1, wherein the actuating element can be actuated with one hand.

17. The workstation according to claim 1, wherein the base station comprises a further actuating element with an electric contactor, wherein the further actuating element is arranged at the workstation, and the electric contactor is connected to the receiving and evaluation unit.

18. An order-picking system with comprising:
   a storage system, and
   at least one workstation connected to the storage system by means of a conveying system, wherein the at least one workstation comprises:
     a remote control device,
     a first provisioning position configured to provide a source load carrier,
     a second provisioning position configured to provide a target load carrier,
     wherein the source load carrier and the target load carrier are provided at the first provisioning position and the second provisioning position to process an order, when processing an order, an operator transferring at least one article unit from the source load carrier into the target load carrier according to the order,
     a process controller that comprises a control input, and
     a confirmation control element connected to the process controller, wherein the confirmation control element comprises a base station and a mobile unit, wherein the base station and the mobile unit are configured to allow a selectively active and inactive wireless data communication connection between the base station and the mobile unit, wherein the base station comprises a receiving and evaluation unit, and the receiving and evaluation unit is electronically configured to always receive electronic data telegrams of the mobile unit using the wireless data communication connection and comprises a switching output connected to the control input of the process controller, wherein the mobile unit comprises an actuating element with an electric contactor, an electric energy storage, and a micro controller with a communication interface, and the micro controller is electronically configured to send an electronic data telegram of the electronic data telegrams by means of the communication interface upon actuation of the actuating element by the operator, wherein the data communication connection is only active during an actuation of the actuating element and the transmission of the electronic data telegram of the electronic data telegrams, wherein the receiving and evaluation unit receives the electronic data telegram of the electronic data telegrams in order to send a signal from the switching output to the control input, and wherein the process controller receives the signal at the control input and the signal is used to trigger a step carried out by the process controller following the current order, or a warehouse management system receives a signal after an actuation of the actuating element by the operator, and the signal is used to trigger a step carried out by the warehouse management system following the current order.

* * * * *

UNITED STATES PATENT AND TRADEMARK OFFICE
CERTIFICATE OF CORRECTION

PATENT NO. : 12,039,466 B2
APPLICATION NO. : 17/614054
DATED : July 16, 2024
INVENTOR(S) : Hannes Himmelbauer It is certified that error appears in the above-identified patent and that said Letters Patent is hereby corrected as shown below:

In the Claims

In Claim 1, (Column 13, Line 23): after "connection" please delete "is established"

In Claim 15, (Column 14, Line 34): after "that" please delete "it"

In Claim 15, (Column 14, Line 37): after "that" please delete "it"

In Claim 18, (Column 14, Line 47): after "system" please delete "with"

Signed and Sealed this
Thirteenth Day of August, 2024

Katherine Kelly Vidal
*Director of the United States Patent and Trademark Office*